United States Patent
Nobuoka

(10) Patent No.: US 7,978,226 B2
(45) Date of Patent: Jul. 12, 2011

(54) IMAGING APPARATUS AND SYSTEM ADOPTING EXTRACTION-TYPE, CAMERA SHAKE CORRECTION, AND CONTROL METHOD THEREOF

(75) Inventor: Kosuke Nobuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 11/849,578

(22) Filed: Sep. 4, 2007

(65) Prior Publication Data

US 2008/0079814 A1 Apr. 3, 2008

(30) Foreign Application Priority Data

Sep. 28, 2006 (JP) ................................. 2006-265424

(51) Int. Cl.
*H04N 5/235* (2006.01)
*H04N 5/228* (2006.01)
(52) U.S. Cl. ................. 348/221.1; 348/208.13
(58) Field of Classification Search .......... 348/303–304, 348/230.1, 205
See application file for complete search history.

(56) References Cited

U.S. PATENT DOCUMENTS

2007/0052811 A1* 3/2007 Suzuki ....................... 348/222.1

FOREIGN PATENT DOCUMENTS

| JP | 08-336076 A | 12/1996 |
| JP | 2000-023024 A | 1/2000 |
| JP | 2000-350101 | * 12/2000 |

* cited by examiner

*Primary Examiner* — Hung H Lam
(74) *Attorney, Agent, or Firm* — Cowan, Liebowitz & Latman, P.C.

(57) ABSTRACT

An imaging apparatus comprises a plurality of pixels, a driving unit configured to successively reset signal charges stored in a photoelectric conversion unit at every predetermined line and successively read out a signal based on the signal charges at every predetermined line, and a control unit. The control unit has a first mode in which a starting readout line of the pixels is fixed and a second mode in which the starting readout line of the pixels is changeable based on input control information. The control unit changes a reset timing of the pixels of the starting readout line in the second mode so as to cause a second charge storage period to be less or equal to a first charge storage period in the second mode.

5 Claims, 11 Drawing Sheets

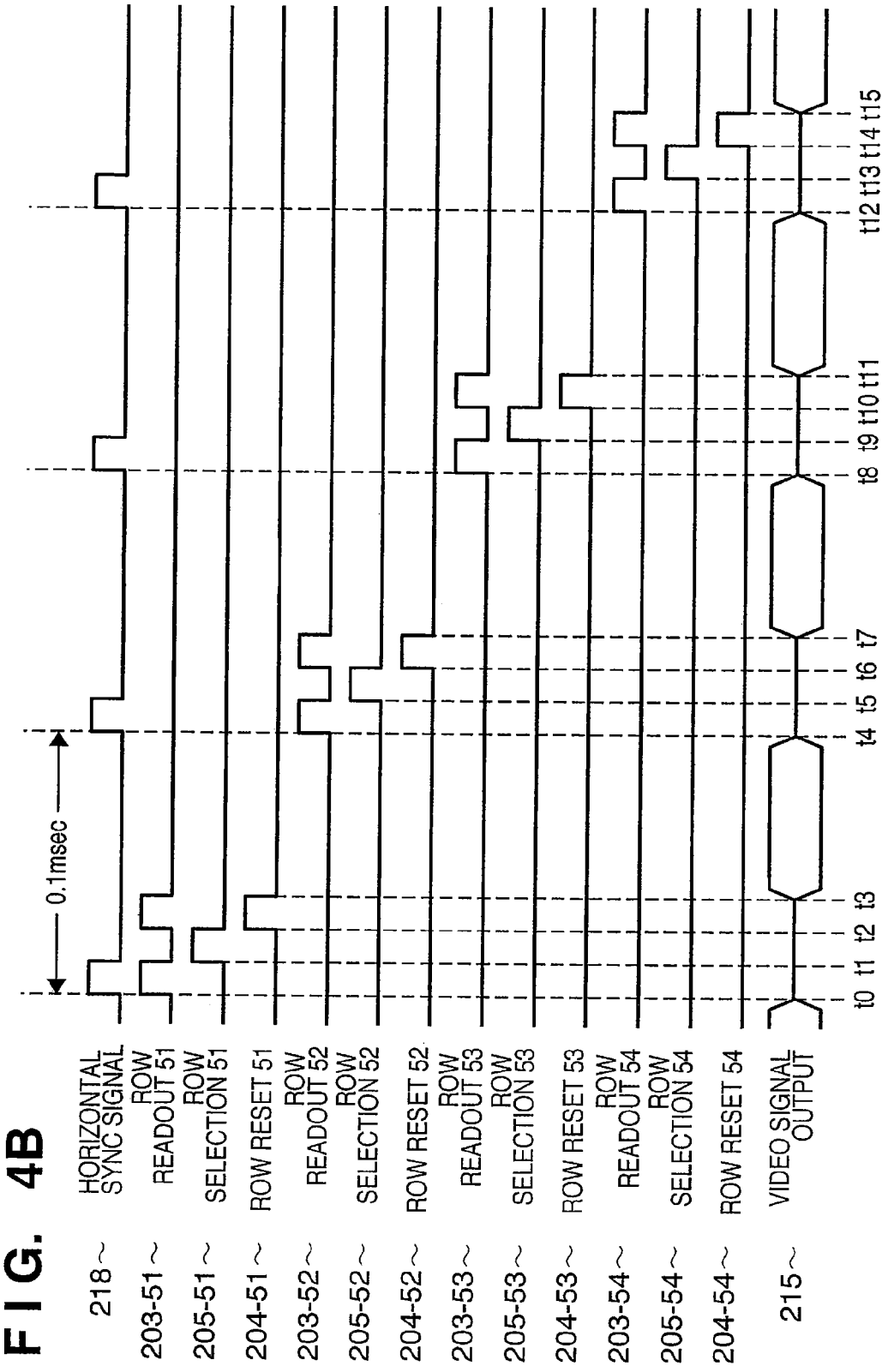

IMAGING APPARATUS AND SYSTEM ADOPTING EXTRACTION-TYPE, CAMERA SHAKE CORRECTION, AND CONTROL METHOD THEREOF

BACKGROUND OF THE INVENTION

1. Field of the Invention

The present invention relates to an imaging apparatus comprising a photoelectric conversion element, a control method thereof and an imaging system. In particular, the present invention relates to an imaging apparatus using a rolling shutter, a control method thereof and an imaging system.

2. Description of the Related Art

An imaging apparatus such as an electronic camera or video camera generally uses a technique (to be referred to as a "camera shake correction technique" hereinafter) of correcting a so-called camera shake as the apparatus becomes compact or the optical design technique such as an optical magnification improves. The camera shake correction techniques roughly fall into optical camera shake correction techniques and electronic camera shake correction techniques. An optical camera shake correction technique controls an optical path change means such as a shift lens arranged in the imaging optical system in accordance with the imaging apparatus' movement by a camera shake. An electronic camera shake correction technique displays part of a sensed image that is extracted based on the acceleration information of the imaging apparatus, thereby canceling the blur of the displayed image. The electronic camera shake correction techniques include a memory-type camera shake correction method and an extraction-type camera shake correction method. The memory-type camera shake correction method records, in a memory, an image read from an imaging element and changes the readout range for readout from the memory. The extraction-type camera shake correction method changes the readout range in reading from the imaging element.

The characteristic features of these camera shake correction techniques will be described below.

The optical camera shake correction technique is expensive because the imaging apparatus incorporates an optical path change means. Additionally, the size of the imaging optical system is large, resulting in a bulky imaging apparatus. However, since the image size does not change, the quality of a sensed image is high. To the contrary, the memory-type camera shake correction method is capable of size reduction of the imaging apparatus and feedforward control based on acceleration information from a sensed image. It is therefore easy to form an electronic camera shake correction system. However, it is necessary to always read out pixels more than display pixels and drive the imaging element at a high speed. The extraction-type camera shake correction method is also advantageous for size reduction of the imaging apparatus. Since it is only necessary to read out pixels equal in number to display pixels, the imaging element need not be driven so quickly as in the memory-type camera shake correction method. However, this method is incapable of feedforward control based on acceleration information from a sensed image. It is therefore necessary to form the electronic camera shake correction system by employing difficult feedback control or separately use an acceleration sensor such as a gyro.

As described above, each camera shake correction method has both merits and demerits. An imaging apparatus employs one of the methods in accordance with its price and marketing target. For example, an expensive high-end model sometimes forms a high-performance camera shake correction system by combining a plurality of methods.

Recently, many imaging apparatuses such as a digital camera or video camera include a CMOS image sensor in place of a CCD image sensor. A CMOS image sensor causes a floating diffusion amplifier to convert signal charges generated by a photodiode into a voltage signal. The voltage signal is read out to a column signal line for each horizontal line in accordance with a row selection signal from a vertical scanning circuit and sequentially read out to the outside in accordance with a horizontal driving signal from a horizontal scanning circuit.

Since the above-described CMOS image sensor executes voltage conversion and readout for each horizontal line, it inevitably employs a rolling shutter scheme in which the start time and end time of charge storage in pixels sequentially shift for each horizontal line. However, when control is performed to make the timing of readout of stored charges in each horizontal line match the timing of the vertical sync signal for driving the imaging element, the readout sensed image is displayed in synchronism with the vertical sync signal. The above-described extraction-type camera shake correction system using such a CMOS image sensor of a rolling shutter type has the following problems.

The extraction-type camera shake correction system using a CMOS image sensor changes the starting readout line in accordance with acceleration information. However, the readout timing of the changed starting readout line must change to, for example, the start position of the vertical sync signal. Additionally, to maintain the constant storage time of pixels, it is necessary to set the charge reset timing of the starting readout line to a predetermined timing back from the readout timing of the starting readout line. Without these changes, the display image vertical position and the storage time shift. Hence, the imaging apparatus using a CMOS image sensor does not employ the extraction-type camera shake correction system.

Japanese Patent Laid-Open No. 2000-350101 discloses a technique of adjusting the charge reset and readout timings of the starting readout line to a predetermined position in accordance with setting of the starting readout line.

A video camera drives an imaging element based on an image format such as NTSC. In, for example, NTSC, the field period is $\frac{1}{16}$ sec=16.7 msec. For this reason, under a normal sensing condition (sensing under sufficient illumination), the storage time of the imaging element is set to 16.7 msec. The optical system, imaging element, and signal processing system are designed such that a signal read out the imaging element can obtain a sufficient imager quality as a final display image. Hence, when charge readout from the photoelectric conversion elements of a predetermined row finishes, the charges in the photoelectric conversion elements of that row are immediately reset. Then, charge storage starts in preparation for readout in the next field.

Assuming this technique, a case will be examined in which the starting readout line changes for each field, as shown in FIG. 9A. In accordance with the technique disclosed in Japanese Patent Laid-Open No. 2000-350101, the readout timing of the starting readout line is adjusted to the timing of the vertical sync signal, and the charge reset timing of the starting readout line is changed to ensure a charge storage period of 16.7 msec. In this case, it is necessary to reset charges in the next field during storage of the starting readout line in the preceding field, as shown in FIG. 9B.

As described above, the extraction-type camera shake correction system almost equally sets the unit field (or unit frame) update period and the charge storage period. For this reason, it is impossible to change the starting readout line for each unit field (or unit frame) in accordance with camera shake information.

SUMMARY OF THE INVENTION

The present invention is provided to prevent overlapping of a reset timing with a charge storage period when changing a starting readout line of a readout.

According to a first aspect of the present invention, there is provided an imaging apparatus, the apparatus comprising a plurality of pixels, each having a photoelectric conversion unit and a resetting unit to reset the photoelectric conversion unit, a driving unit configured to successively reset signal charges stored in the photoelectric conversion unit at every predetermined line and successively read out a signal based on the signal charges at every predetermined line, and a control unit which has a first mode in which a starting readout line of the pixels is fixed and a second mode in which the starting readout line of the pixels is changeable based on input control information; and which changes a reset timing of the pixels of the starting readout line in the second mode so as to cause a second charge storage period to be less or equal to a first charge storage period in the second mode.

According to a second aspect of the present invention, there is provided an imaging system, the imaging system comprising an optical system, and an imaging apparatus as defined above.

According to a third aspect of the present invention, there is provided a method for controlling an imaging apparatus that comprises a plurality of pixels, each having a photoelectric conversion unit and a resetting unit to reset the photoelectric conversion unit; a driving unit configured to successively reset signal charges stored in the photoelectric conversion unit at every predetermined line and successively read out a signal based on the signal charges at every predetermined line; and a control unit, the control unit having a first mode in which a starting readout line of the pixels is fixed and a second mode in which the starting readout line of the pixels is changeable based on input control information, the method comprising steps of changing a reset timing of the pixels of the starting readout line in the second mode so as to cause a second charge storage period to be less or equal to a first charge storage period in the second mode.

Further features of the present invention will become apparent from the following description of exemplary embodiments with reference to the attached drawings.

BRIEF DESCRIPTION OF THE DRAWINGS

FIG. 4B is a diagram showing an operation timing in a mode without camera shake correction;

DESCRIPTION OF THE EMBODIMENTS

First Embodiment

Figure 1:
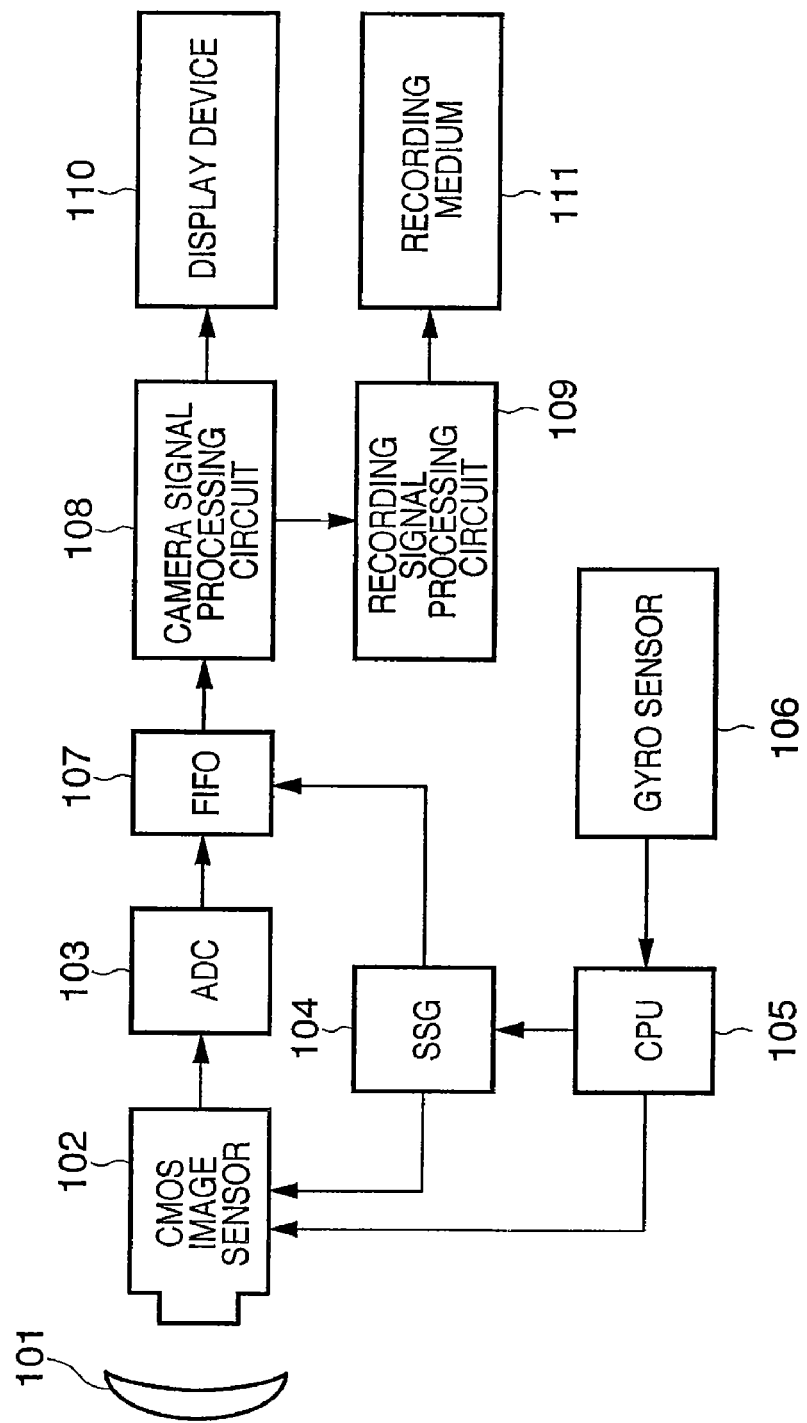
FIG. 1 is an overall diagram showing a schematic configuration of an imaging system according to a preferred first embodiment of the present invention.

FIG. 1 is an overall diagram showing a schematic configuration of an imaging system according to a preferred first embodiment of the present invention. Referring to FIG. 1, Reference numeral 101 denotes an imaging lens serving as an optical system; 102, a CMOS image sensor; 103, an analog/digital converter (to be referred to as an "ADC" hereinafter); 104, a sync signal generation circuit (to be referred to as an "SSG" hereinafter) serving as a driving means; 105, a CPU serving as a control means; 106, a gyro sensor; 107, a FIFO formed from a 2-port SRAM; 108, a camera signal processing circuit; 109, a recording signal processing circuit; 110, a display device such as a liquid crystal panel; and 111, a recording medium such as a DVD disk.

Figure 2:
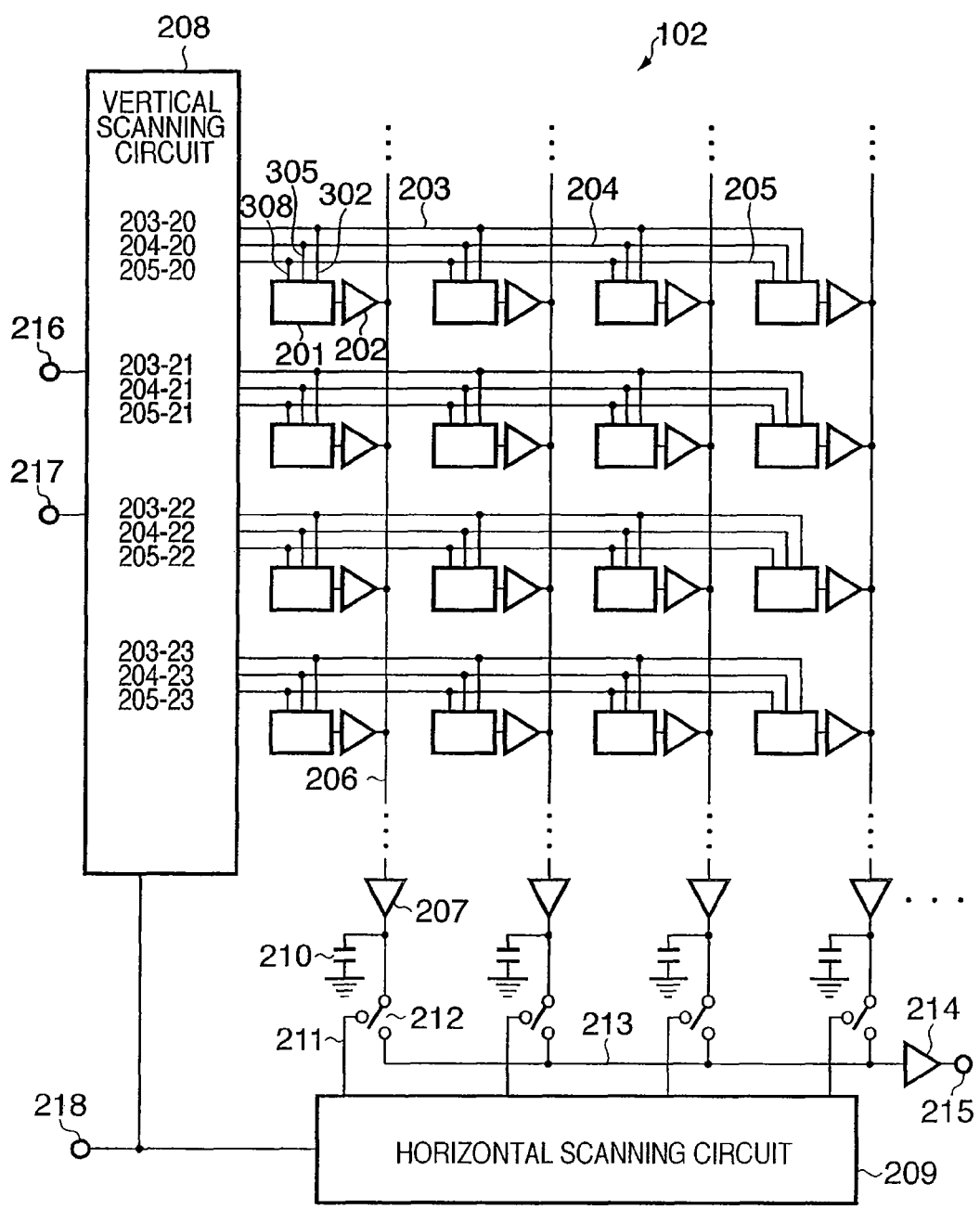
FIG. 2 is an overall circuit block diagram showing an internal configuration of a CMOS image sensor according to a preferred first embodiment of the present invention.

FIG. 2 is an overall circuit block diagram showing an internal configuration of a CMOS image sensor according to the preferred first embodiment of the present invention. Referring to FIG. 2, reference numeral 201 denotes a pixel in FIG. 3 (to be described later); 202, a floating diffusion amplifier (to be referred to as an FD amplifier hereinafter); 203, a row readout control line (20th to 23rd row readout control lines are expressed by 203-20 to 203-23 in FIG. 2); 204, a row reset control line (20th to 23rd row reset control lines are expressed by 204-20 to 204-23 in FIG. 2); 205, a row selection line (20th to 23rd row selection lines are expressed by 205-20 to 205-23 in FIG. 2); 206, a column signal line; 207, a column amplifier; 208, a vertical scanning circuit; 209, a horizontal scanning circuit; 210, a column signal buffer capacitance; 211, a column selection line; 212, a column selection switch; 213, a horizontal signal line; 214, an output buffer amplifier; 215, a video output terminal; 216, a vertical sync signal input terminal; 217, a starting readout line setting input terminal; and 218, a horizontal sync signal input terminal.

Figure 3:
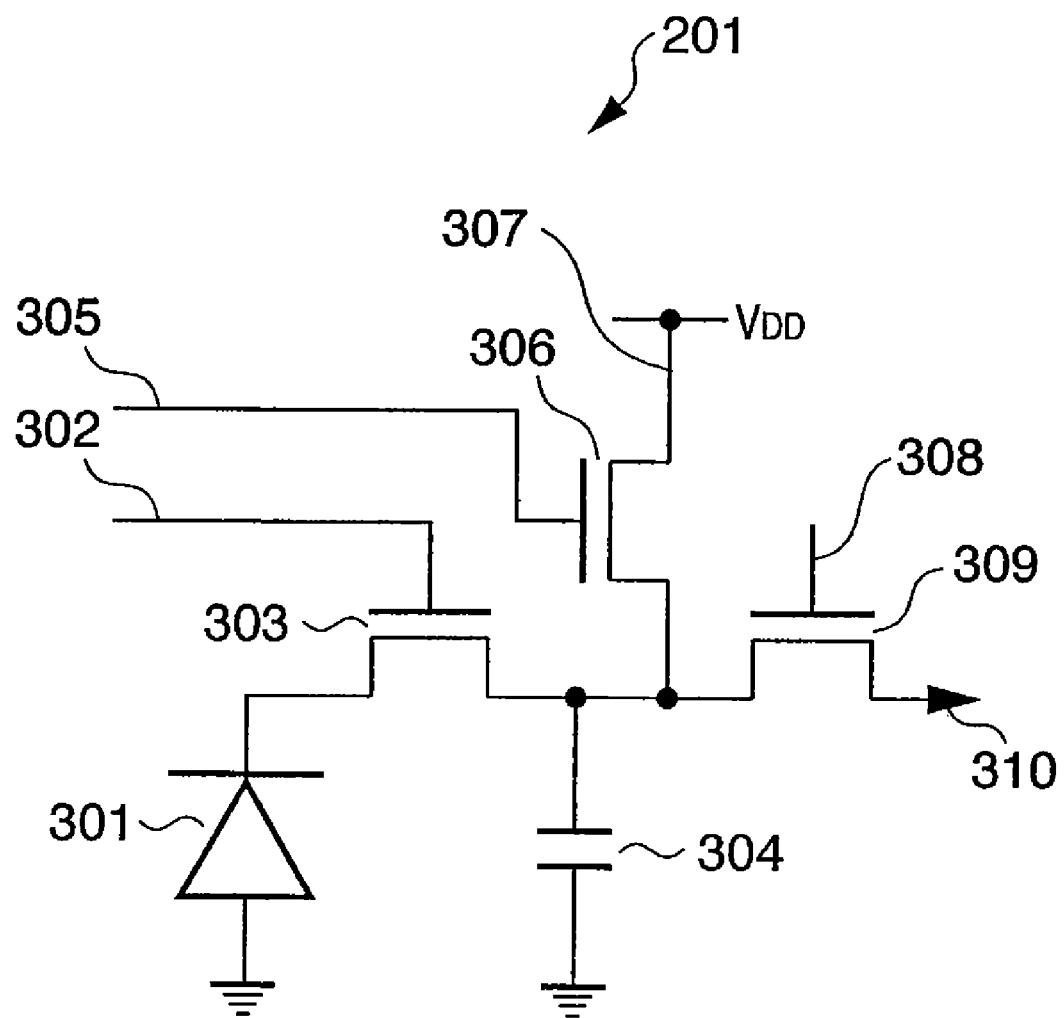
FIG. 3 is a circuit block diagram showing an example of a schematic configuration of a pixel as illustrated in FIG. 2.

FIG. 3 is a circuit block diagram showing an example of a schematic configuration of the pixel 201 as illustrated in FIG. 2. Referring to FIG. 3, reference numeral 301 denotes a photodiode (to be referred to as a "PD" hereinafter) serving as a photoelectric conversion means; 302, a row readout control input line (connected to the row readout control line 203 in FIG. 2); 303, a row readout transistor; 304, a floating diffusion (to be referred to as an "FD" hereinafter) serving as a storage means; 305, a row reset control input line (connected to the row reset control line 204 in FIG. 2); 306, a row reset transistor serving as a reset means; 307, a reset level input line; 308, a row selection control input line (connected to the row selection line 205 in FIG. 2); 309, a row selection transistor; and 310, a pixel output terminal.

The operation of the imaging system according to the preferred first embodiment of the present invention will be described next. When light forms an optical image on the light-receiving surface of the CMOS image sensor 102 through the imaging lens 101, the PDs in the CMOS image sensor 102 generate signal charges corresponding to the amount of light incident on the pixels. The internal driving circuit of the CMOS image sensor 102 is driven in accordance with a sync signal generated by the SSG 104 and setting of the starting readout line set by the CPU 105. The output terminal outputs the signal charges generated in the pixels in a predetermined order as an output video voltage signal. The ADC 103 converts the output video voltage signal into a digital signal and inputs it to the FIFO 107. The SSG 104 executes address control of the FIFO 107. The FIFO 107 operates in accordance with setting of a FIFO starting readout pixel set by the CPU 105. The CPU 105 sets the starting readout line and FIFO starting readout pixel based on acceleration information which is generated in the imaging apparatus in FIG. 1 and detected by the gyro sensor 106. Vertical acceleration information from the gyro sensor 106 is reflected on the starting readout line. Horizontal acceleration information is reflected on the setting of the FIFO starting readout pixel. Since the description of the operation of this embodiment is related to control of the starting readout line, acceleration information from the gyro sensor 106 is assumed to be vertical acceleration information.

The operation of the CMOS image sensor 102 in FIG. 1 will be described next with reference to FIGS. 2 and 3. The FD 304 in FIG. 3 includes a capacitance and generates a voltage corresponding to signal charges stored in it. First, the row reset control input line 305 changes to high level to turn on the row reset transistor 306. A power supply $V_{DD}$ connected to the reset level input line 307 resets the FD 304 to the reset level (e.g., power supply voltage $V_{DD}$). The PD 301 stores signal charges corresponding to the amount of light incident on the pixel. When the row readout control input line 302 changes to high level to turn on the row readout transistor 303, the signal charges stored in the PD 301 are transferred to the FD 304. At this time, in the FD 304, a voltage level corresponding to the signal charges transferred from the PD 301 is added to the reset level. This is the signal level of the readout pixel. When the row selection control input line 308 changes to high level to turn on the row selection transistor 309, the FD amplifier 202 connected to the pixel output terminal 310 converts the signal level of the FD 304 into a pixel voltage signal. The signal passes through the column signal line 206. The column amplifier 207 amplifies the signal. The column signal buffer capacitance 210 stores the signal amplified by the column amplifier 207. As a result, the column signal buffer capacitances 210 store voltage signals obtained by amplifying the output signals from the FDs 304 of one row. When the horizontal scanning circuit 209 supplies a control signal to the column selection lines 211 in accordance with a predetermined timing and order, the column selection switches 212 are sequentially turned on/off. The video output terminal 215 sequentially outputs the signals of one row stored in the column signal buffer capacitances 210 via the horizontal signal line 213 and output buffer amplifier 214.

Figure 4A:
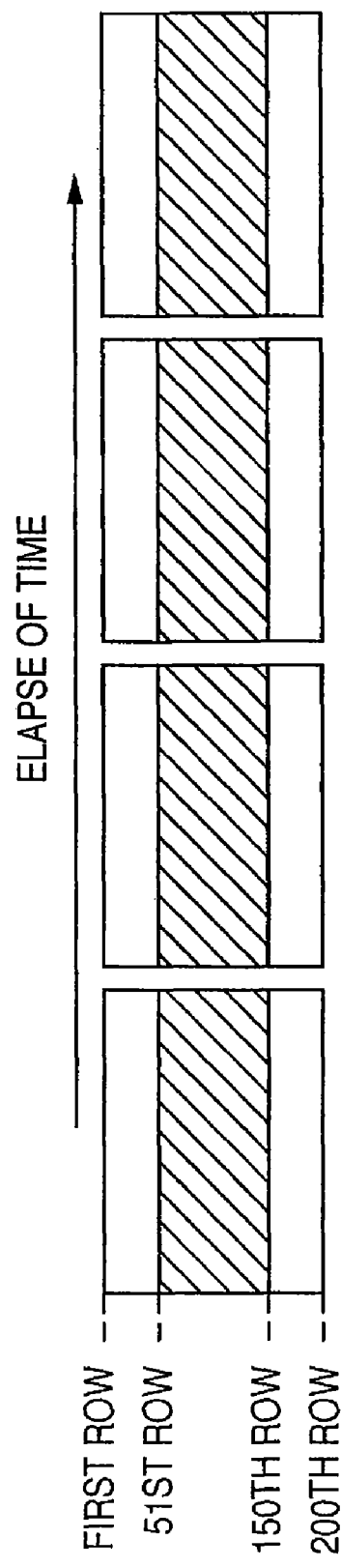
FIG. 4A is a diagram showing an operation timing in a mode without camera shake correction.
Figure 4C:
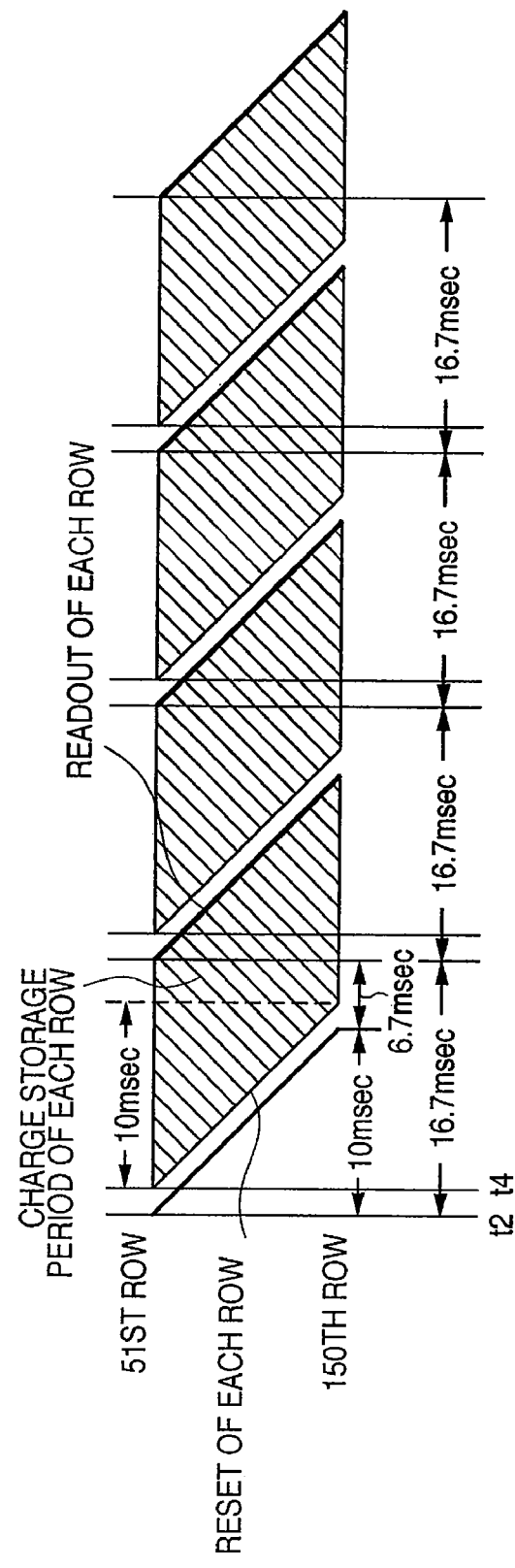
FIG. 4C is a diagram showing an operation timing in a mode without camera shake correction.
Figure 6A:
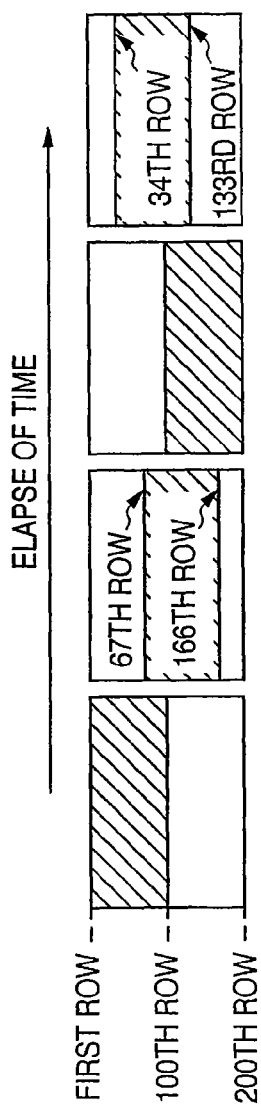
FIG. 6A is a diagram showing an operation timing in a mode with camera shake correction.
Figure 6B:
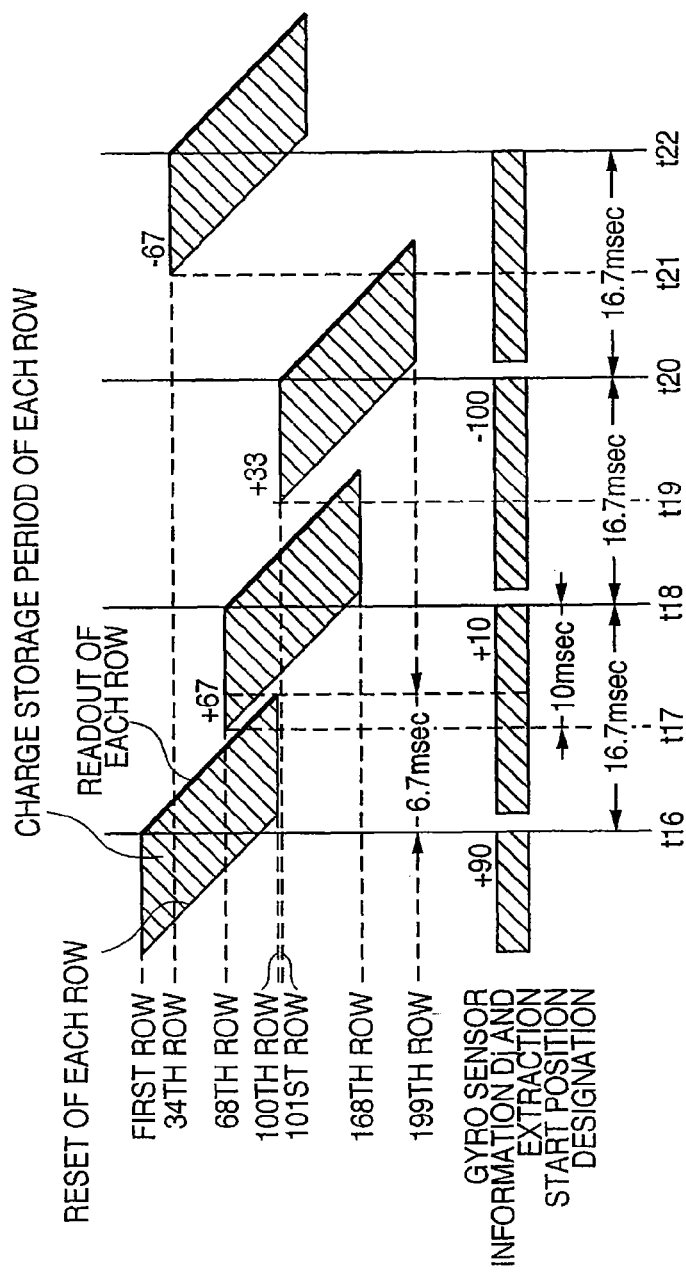
FIG. 6B is a diagram showing an operation timing in a mode with camera shake correction.

The above-described readout operation is controlled as in FIGS. 4A to 4C (mode without camera shake correction) or FIGS. 6A and 6B (mode with camera shake correction), thereby executing the full-screen readout operation.

The readout operation in the mode without camera shake correction will be described first with reference to FIGS. 4A to 4C. Assume that the number of rows in the vertical direction of the imaging element is 200, the readout field period is 1/60 sec (16.7 msec), the time required for outputting pixel signals of one row is 0.1 msec, the number of readout rows is 100, and the 100 remaining rows correspond to the movable range of camera shake correction. Readout of 100 rows requires 10 msec. The vertical blanking period is 6.7 msec (=16.7 msec (field period)−10 msec (read out time)). These values are merely examples, and the present invention is not limited to these.

In the mode without camera shake correction, 100 rows (51st to 150th rows) at the center of all the first to 200th rows are read out, as shown in FIG. 4A. FIG. 4B shows the relationship between the horizontal sync signal and the operations of the row readout control signal, row reset control signal, row selection control signal, and video output signal.

Readout driving of the 51st row starts from a rising time t0 of the horizontal sync signal input to the horizontal sync signal input terminal 218.

At time t0 to t1, row readout 51 is performed to execute the readout of the 51st row. More specifically, the row readout control line 203-51 changes to high level to turn on the row readout transistor 303 in FIG. 3 so that signal charges stored in the PD 301 are transferred to the FD 304.

At time t1 to t2, row selection 51 is performed. The column amplifier 207 amplifies the pixel voltage signal of the 51st row. The column signal buffer capacitance 210 stores the signal. More specifically, the row selection line 205-51 changes to high level to turn on the row selection transistor 309 in FIG. 3. The FD amplifier 202 in FIG. 2 converts the signal level of the FD 304 into a pixel voltage signal. The signal passes through the column signal line 206. The column amplifier 207 amplifies the signal. The column signal buffer capacitance 210 stores the signal amplified by the column amplifier 207.

At time t2 to t3, row reset 51 is performed to simultaneously reset the potentials of the PD 301 and FD 304 of the 51st row to the reset level (e.g., power supply voltage $V_{DD}$). The PD 301 stores signal charges until the readout of the 51st row is executed in the next field or next frame. More specifically, the row reset control line 204-51 changes to high level to turn on the row readout transistor 303 and row reset transistor 306 in FIG. 3. The power supply $V_{DD}$ connected to the reset level input line 307 simultaneously resets the PD 301 and FD 304 to the reset level.

Time t3 to t4 is the horizontal readout period of the horizontal scanning circuit 209.

The period of t0 to t4 corresponds to 0.1 msec described above. In a similar manner, row readout, row selection, and row reset of the 52nd to 54th rows are executed sequentially. The above-described readout driving of the respective rows are sequentially executed up to the 150th row, as shown in FIG. 4C. A time of 10 msec elapses from the row readout time t2 of the 51st row as the starting readout line to the end of row readout of the 150th row. Similarly, a time of 10 msec elapses from the row reset time t4 of the 51st row to the end of row reset of the 150th row. After the elapse of the vertical blanking period of 6.7 msec, row readout of the 51st row as the starting readout line starts again in the next field. Charge storage in the pixels of each row continues even during vertical blanking and therefore requires 16.7 msec (however, the time shortens by several msec corresponding to the period of time t2 to t4).

Figure 5:
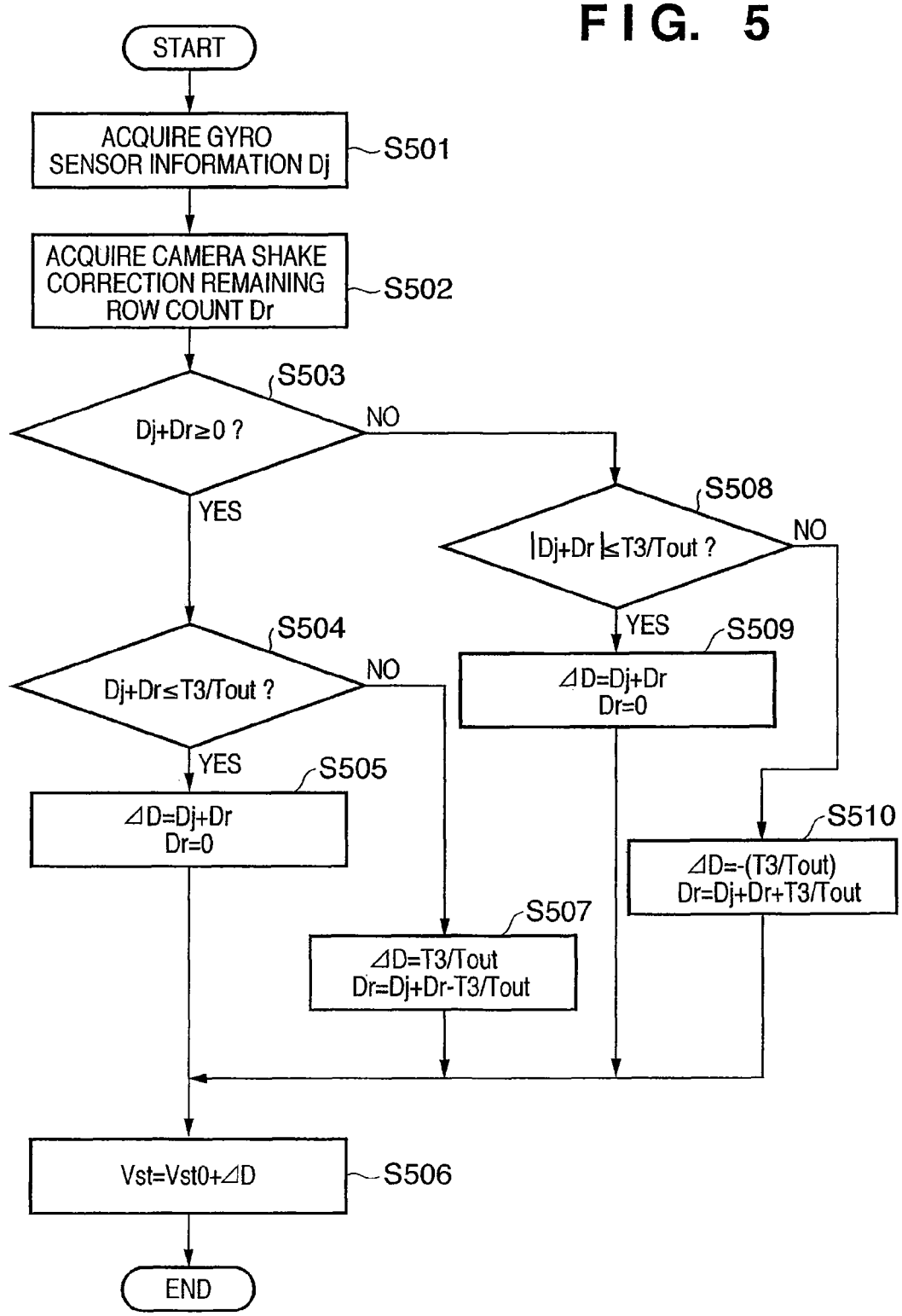
FIG. 5 is a flowchart showing a readout operation in a mode with camera shake correction.

The readout operation in the mode with camera shake correction will be described next with reference to FIG. 5. FIG. 5 is a flowchart showing the readout operation in the mode with camera shake correction. The CPU 105 in FIG. 1 reads out program codes from a predetermined storage medium to execute the process shown in FIG. 5.

In step S501, the CPU 105 acquires gyro sensor information Dj from the gyro sensor 106 in FIG. 1. The gyro sensor information Dj is acceleration information from an acceleration sensor such as a gyro.

In step S502, the CPU 105 acquires a camera shake correction remaining row count Dr from the vertical scanning circuit 208. The camera shake correction remaining row count Dr corresponds to the difference between an extraction position designation (e.g., +90, +10, or −100 in FIG. 6B) from the gyro sensor 106 and the starting readout line set for the next field.

In step S503, the CPU 105 determines whether Dj+Dr≧0. If Dj+Dr≧0 ("YES" in step S503), the process advances to step S504. If Dj+Dr<0 ("NO" in step S503), the process advances to step S508.

In step S504, the CPU 105 subtracts a charge storage period T1 in the mode with camera shake correction from a charge storage period T2 in the mode without camera shake correction, thereby obtaining T3 (=T2−T1). The CPU 105 divides T3 by a time Tout required for outputting pixel signals of one row and determines whether Dj+Dr≦quotient T3/Tout. If Dj+Dr≦T3/Tout ("YES" in step S504), the process advances to step S505. If Dj+Dr>T3/Tout ("NO" in step S504), the process advances to step S507.

In step S505, the CPU 105 sets the camera shake correction remaining row count Dr to 0 and ΔD to Dj+Dr.

In step S506, the CPU 105 adds ΔD set in step S505 to an initial value Vst0 (=1 normally) of the starting readout line and sets the sum as a starting readout line Vst.

In step S507, the CPU 105 sets the camera shake correction remaining row count Dr to Dj+Dr−T3/Tout and ΔD to T3/Tout.

In step S508, the CPU 105 determines whether the absolute value |Dj+Dr|≦T3/Tout. If |Dj+Dr|≦T3/Tout ("YES" in step S508), the process advances to step S509. If |Dj+Dr|>T3/Tout ("NO" in step S508), the process advances to step S510.

In step S509, the CPU 105 sets the camera shake correction remaining row count Dr to 0 and ΔD to Dj+Dr.

In step S510, the CPU 105 sets the camera shake correction remaining row count Dr to Dj+Dr+T3/Tout and ΔD to −(T3/Tout).

The readout operation in the mode with camera shake correction will be described next with reference to FIGS. 6A and 6B. In the mode with camera shake correction, to cope with a camera shake correction operation for a changed starting readout line, the charge storage period of the pixels of each row is set to 1/100 sec. As described above, in this embodiment, the time required for outputting pixel signals of one row is 0.1 msec, and the charge storage period in the mode without camera shake correction is 16.7 msec. Hence, a starting readout line change range Dmax is given by $$Dmax \leq (T0-T1)/Tout = (16.7 \text{ msec} - 10 \text{ msec})/0.1 \text{ msec} \quad (1)$$
$$= 67$$

The starting readout line change range Dmax is limited to, for example, 67 rows or less by using the above-described numerical values.

The gyro sensor 106 in FIG. 1 totalizes acceleration information of the imaging apparatus itself by a camera shake independently of imaging element driving, as shown in FIG. 6B. At row readout start times t16, t18, and t20 in FIG. 6B, the starting readout line in the next field is obtained from the gyro sensor information Dj. At the time t16, the starting readout line is designated to +90 rows. At the time t18, the starting readout line is designated to +10 rows. At the time t20, the starting readout line is designated to −100 rows. The starting readout line is decided in accordance with the flow in FIG. 5 in consideration of the restriction of inequality (1), that is, Dmax≦67 rows, and set in the vertical scanning circuit 208 via the starting readout line setting input terminal 217 in FIG. 2. Row readout from the starting readout line, row selection, and row reset are the same as in the above-described operation in the mode without camera shake correction, and a description thereof will be omitted.

In the first field starting from the time t16 in FIG. 6B, readout starts from the first row. Since readout of one row takes 0.1 msec, a time of 6.7 msec elapses until the end of readout of the 68th row. The charge storage period in each row is set to 10 msec, and that in one field is set to 16.7 msec. It is therefore impossible to ensure the storage time of 10 msec in readout in the second field unless the starting readout line of the second field is reset, and storage starts at the time t17 after the end of readout of the 68th row. The starting readout line of the second field is the 91st row (=first row+90 rows) obtained at the time t16. However, since the storage (before readout) of the first field is progressing at the time t17, the 91st row cannot be set as the starting readout line of the second field ("NO" in step S504 in FIG. 5). Hence, the starting readout line of the second field is set to the 68th row (=first row+67 rows) obtained at the time t16 (corresponding to step S507 in FIG. 5). Reset and storage of the 68th row start at the time t17. The camera shake correction remaining row count of the second field becomes +23 rows.

At the time t18 in FIG. 6B, since the starting readout line of the second field changes by +67 rows, readout starts from the 68th row. As in the first field, the readout time of one row is 0.1 msec, and the charge storage period is 10 msec. For this reason, it is necessary to reset the starting readout line of the third field and start storage at a time t19 after the end of readout of the 135th row (=68th row+67 rows). In the third field, +10 rows obtained at the time t18 are added to +23 rows of the camera shake correction remaining rows of the second field, and the sum, that is, +33 rows are added to the 68th row as the starting readout line of the second field. Hence, the starting readout line of the third field is the 101st row. At the time t19, since the readout of the 101st row of the second field has ended, the starting readout line of the third field can be set to the 101st row. In the third field, the camera shake correction remaining row count is 0.

At the time t20 in FIG. 6B, as the starting readout line of the third field changes, readout starts from the 101st row. At a time t21 after the end of readout of the 168th row (=101st row+67 rows), the starting readout line of the fourth field is reset, and storage starts. As for the starting readout line of the fourth field, −100 rows obtained at the time t20 (corresponding to step S501 in FIG. 5) are added to 0 row of the camera shake correction remaining rows of the third field (corresponding to step S502 in FIG. 5). The sum, that is, −100 rows are added to the 101st row as the starting readout line of the third field. Hence, the starting readout line is the first row. At the time t21, readout of the first row of the third field is not executed. It is therefore possible to set the starting readout line of the fourth field to the first row. However, since the change range in changing the starting readout line of the second field is limited to +67 rows, the change range of the fourth field is limited to −67 rows to maintain the symmetry in the direction of the camera shake correction effect ("NO" in step S508 in FIG. 5). The starting readout line of the fourth field is set to 101st row −67 rows=34th row (corresponding to step S510 in FIG. 5). At the time t21, the 34th row is not read out in the third field. It is therefore possible to set the starting readout line of the fourth field. The correction remaining row count of the fourth field is −33 rows.

In this way, camera shake correction in the vertical direction can be performed in consecutive fields by setting the starting readout line based on the gyro sensor information Dj. It is also possible to provide image signals stored in a storage time of 1/100 sec=10 msec in each readout row. Note that the method is applicable to an arbitrary field or frame period or arbitrary storage time by setting the storage time in the mode with camera shake correction to be shorter than the field period described in this embodiment, and limiting the change range of the starting readout line in accordance with inequality (1). Camera shake correction in the horizontal direction can be performed by controlling the starting readout pixel of the FIFO 107 based on horizontal acceleration information from the gyro sensor 106, as described above. After the camera shake correction, the camera signal processing circuit 108 executes camera signal processing. The display device 110 displays an image. The sensed image is recorded in the recording medium 111 via the recording signal processing circuit 109.

As described above, according to this embodiment, it is possible to prevent overlapping of the reset timing with the charge storage period when changing the starting readout line. Consequently, an extraction-type camera shake correction system can be employed, unlike a conventional imaging apparatus using a CMOS image sensor of a rolling shutter type.

Second Embodiment

Figure 7:
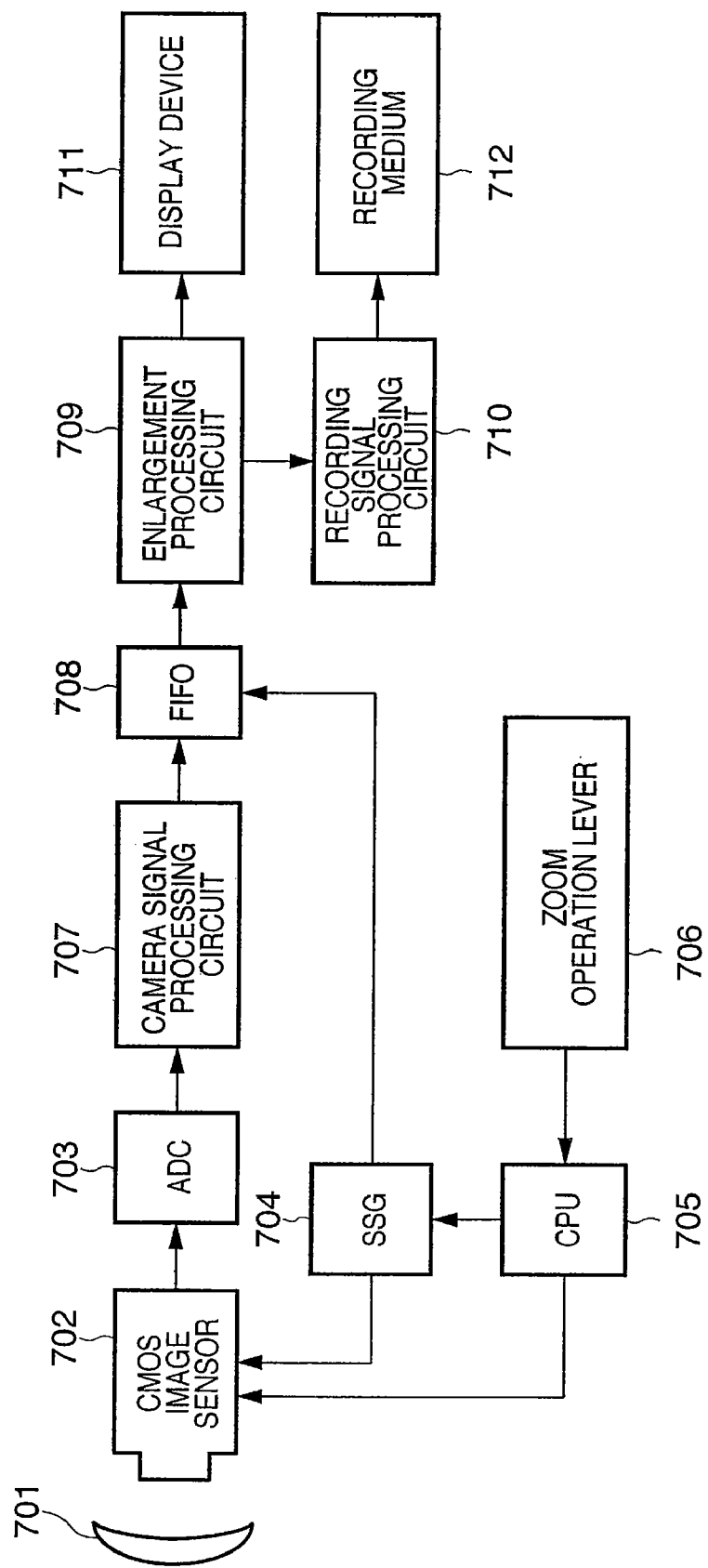
FIG. 7 is an overall diagram showing a schematic configuration of an imaging system according to a preferred second embodiment of the present invention.

FIG. 7 is an overall diagram showing a schematic configuration of an imaging system according to a preferred second embodiment of the present invention. Referring to FIG. 7, Reference numeral 701 denotes an imaging lens serving as an optical system; 702, a CMOS image sensor; 703, an ADC; 704, an SSG; 705, a CPU; 706, a zoom operation lever; 707, a camera signal processing circuit; 708, a FIFO formed from a 2-port SRAM; 709, an enlargement processing circuit; 710, a recording signal processing circuit; 711, a display device such as a liquid crystal panel; and 712, a recording medium such as a DVD disk. The internal configuration of the CMOS image sensor 702 is the same as in FIGS. 2 and 3, and a description thereof will be omitted.

The operation of the imaging system according to the preferred second embodiment of the present invention will be described next. The operations of the imaging lens 701, CMOS image sensor 702, ADC 703, SSG 704, and CPU 705 are the same as in the first embodiment, and a description thereof will be omitted. When the user of the imaging system of this embodiment operates the zoom operation lever 706, the CPU 705 calculates electronic zoom information of each unit field corresponding to the set position of the zoom operation lever 706. The electronic zoom information contains a horizontal electronic zoom magnification and a vertical electronic zoom magnification. The CPU 705 calculates the starting readout line and ending readout line of the CMOS image sensor 702 based on the vertical electronic zoom magnification. The CPU 705 calculates the starting readout pixel position and ending readout pixel position of the FIFO 708 based on the horizontal electronic zoom magnification. The starting readout line is limited depending on setting of the storage time of the CMOS image sensor 702. For this reason, the electronic zoom magnification is recalculated after the starting readout line is determined to calculate the starting readout pixel and ending pixel of the FIFO 708 and set the enlargement processing circuit 709.

The CPU 705 sets the starting readout pixel position and ending readout pixel position of the FIFO 708 in the SSG 704 and enlargement processing circuit 709 and the starting readout line and ending readout line of the CMOS image sensor 702 in the SSG 704. The readout operation of the CMOS image sensor 702 is executed like that of the first embodiment in accordance with the set starting line and ending line.

The imaging system of this embodiment has a mode with electronic zoom and a mode without electronic zoom. In the mode without electronic zoom, 100 rows from the first to 100th rows are read out in each field. As in the operation of the first embodiment, when the readout time per row of the CMOS image sensor 702 is 0.1 msec, readout of 100 rows takes 10 msec. When a vertical blanking period of 6.7 msec is set, one field is driven in 16.7 msec. The second storage time in the mode without electronic zoom is also set to 16.7 msec, as in the first embodiment.

Figure 8A:
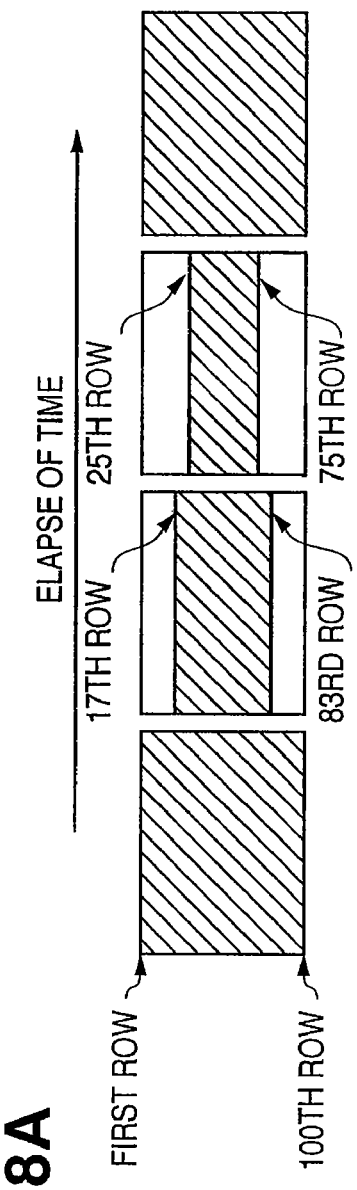
FIG. 8A is a diagram showing an operation timing in an electronic zoom mode.
Figure 8B:
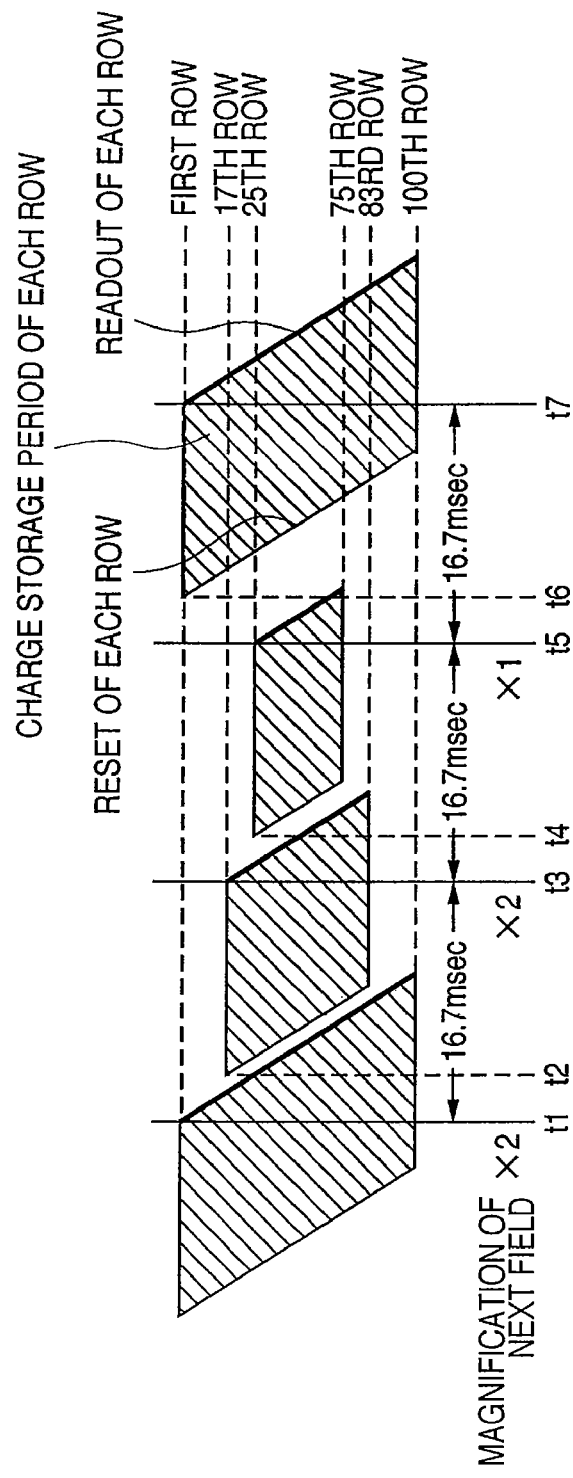
FIG. 8B is a diagram showing an operation timing in an electronic zoom mode.
Figure 9A:
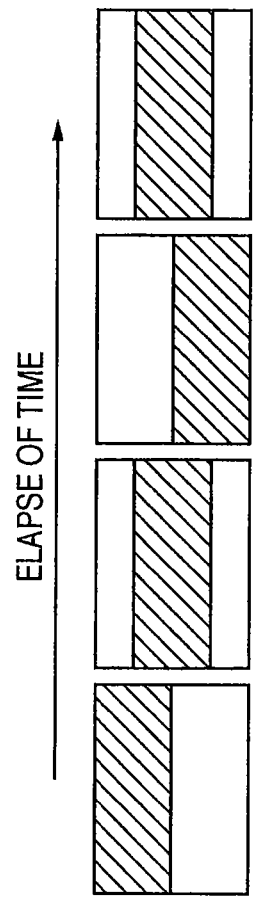
FIG. 9A is a diagram showing a problem of prior art.
Figure 9B:
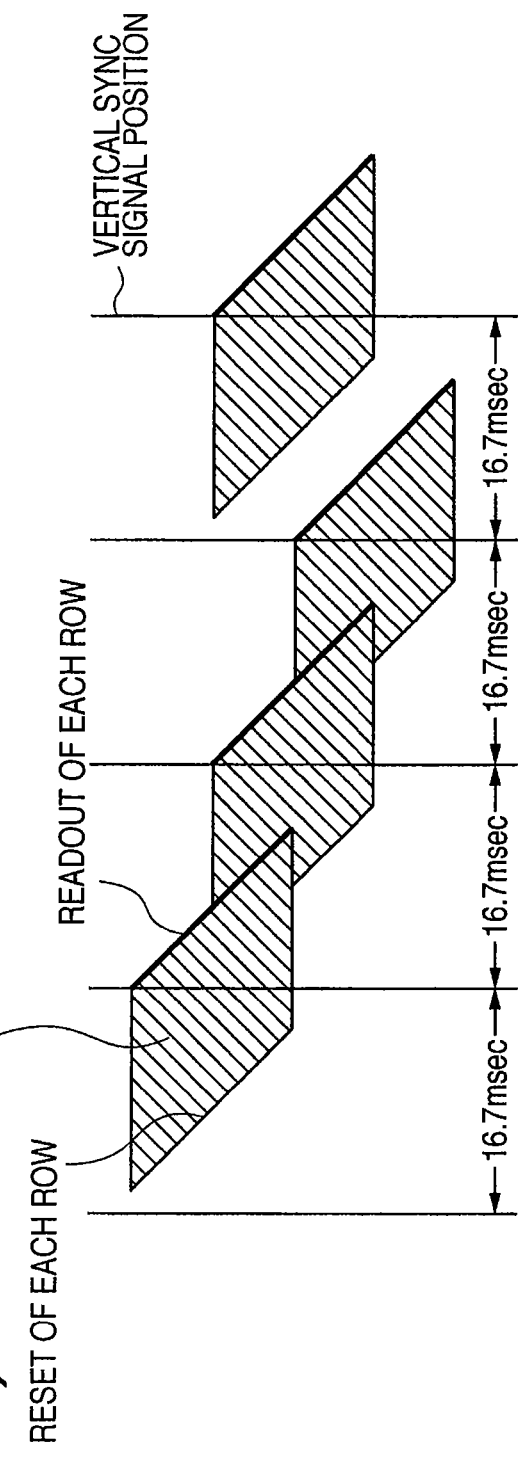
FIG. 9B is a diagram showing a problem of prior art.

In the mode with electronic zoom, the first storage time is set to 15 msec. As shown in FIG. 8A, in the first field, readout starts from the first row at a time t1 and continues up to the 100th row. When the electronic zoom magnification in the second field is set to 2×, the starting readout line of the second field is the 25th row. Since the difference between the second storage time and the first storage time is 1.7 msec, it is necessary to reset the 25th row at a time t2 after a time of 1.7 msec elapses from the time t1. However, the storage of the first field is progressing at the time t2. At the time t2, the first to 17th rows have been read out because 1.7 msec/0.1 msec=17. Hence, the 17th row is set to the starting readout line of the second field. As a result, the electronic zoom magnification in the second field is not 2× but 1.5×=100 rows/(100 rows−17 rows×2)=100/66. Calculation of the starting readout pixel and ending pixel of the FIFO 708 and setting of the enlargement processing circuit 709 are performed by using the electronic zoom magnification of 1.5×.

In the second field, readout starts from the 17th row at a time t3 and continues up to the 83rd row=100 rows−17 rows. If the electronic zoom magnification in the third field remains 2×, the starting readout line of the third field is the 25th row. It is necessary to reset the 25th row at a time t4 after a time of 1.7 msec elapses from the time t3. At the time t4, 17 rows=1.7 msec/0.1 msec from the 17th row as the starting readout line of the second field to the 34th row have been read out. It is therefore possible to reset the 25th row. Hence, the electronic zoom magnification in the third field is 2×. Calculation of the starting readout pixel and ending pixel of the FIFO 708 and setting of the enlargement processing circuit 709 are performed by using the electronic zoom magnification of 2×.

In the third field, readout starts from the 25th row at a time t5 and continues up to the 75th row=100 rows−25 rows. If the electronic zoom magnification in the fourth field is set to 1×, the starting readout line of the fourth field is the first row. It is necessary to reset the first row at a time t6 after a time of 1.7 msec elapses from the time t5. Since the first row is not read out in the third field, it is possible to reset the first row. Hence, the electronic zoom magnification in the fourth field is 1×. Calculation of the starting readout pixel and ending pixel of the FIFO 708 and setting of the enlargement processing circuit 709 are performed by using the electronic zoom magnification of 1×.

In the fourth field, readout starts from the first row at a time t7 and continues up to the 100th row.

As described above, in the mode with electronic zoom, the storage time shortens by 1.7 msec to make it possible to change the starting readout line in the range of 17 rows. In this embodiment, it is possible to set an arbitrary storage time as long as the storage time in the mode with electronic zoom is equal to or less than that in the mode without electronic zoom.

It is also possible to recalculate the starting readout line and the electronic zoom magnification in each field so that the output image in the FIFO 708 can have a desired pixel size in each field. The enlargement processing circuit 709 can execute a desired enlargement process and output an enlarged image by recalculating the starting readout line and the electronic zoom magnification in each field. The enlarged image is supplied to the recording signal processing circuit 710, a display device 711, and a recording medium 712, as in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-265424, filed Sep. 28, 2006, which is hereby incorporated by reference herein in its entirety.

What is claimed is:

1. An imaging apparatus comprising:
a plurality of pixels, each having a photoelectric conversion unit and a resetting unit to reset the photoelectric conversion unit;
a driving unit configured to successively reset signal charges stored in the photoelectric conversion unit at every predetermined line and successively read out a signal based on the signal charges at every predetermined line, and
a control unit which has a first mode in which a starting readout line of the pixels is fixed and a second mode in which the starting readout line of the pixels is changeable based on input control information; and which controls a second charge storage period T1 in the second mode to be less or equal to a first charge storage period T2 in the first mod;
wherein the control unit is configured to limit a change range Dmax of the starting readout line in the second mode based on a difference between the first charge storage period T2 and the second charge storage period T1, and the change range Dmax is given by an equation Dmax <(T2−T1)/Tout, where Tout is an output period of stored charges of the pixels at every line.

2. The apparatus according to claim 1, wherein the second mode is a camera shake correction mode and the control information is a camera shake information of the imaging apparatus.

3. The apparatus according to claim 1, wherein the second mode is an electronic zoom mode and the control information is an electronic zoom magnification.

4. An imaging system comprising:
an optical system; and
an imaging apparatus as defined in claim 1.

5. A method for controlling an imaging apparatus that comprises a plurality of pixels, each having a photoelectric conversion unit and a resetting unit to reset the photoelectric conversion unit; a driving unit configured to successively reset signal charges stored in the photoelectric conversion unit at every predetermined line and successively read out a signal based on the signal charges at every predetermined line; and a control unit,
the control unit having a first mode in which a starting readout line of the pixels is fixed and a second mode in which the starting readout line of the pixels is changeable based on input control information,
the method comprising steps of:
controlling a second charge storage period T1 in the second mode to be less or equal to a first charge storage period T2 in the seem first mode,
wherein a change range Dmax of the starting readout line in the second mode is limited based on a difference between the first charge storage period T2 and the second charge storage period T1, and the change range Dmax is given by an equation Dmax ≦(T2−T1)/Tout, where Tout is an output period of stored charges of the pixels at every line.

\* \* \* \* \*